(12) United States Patent
Barber

(10) Patent No.: US 7,434,392 B2
(45) Date of Patent: Oct. 14, 2008

(54) CONFIGURABLE HYDRAULIC SYSTEM FOR AGRICULTURAL TRACTOR AND IMPLEMENT COMBINATION

(75) Inventor: Dennis R. Barber, Oconomowoc, WI (US)

(73) Assignee: HUSCO International, Inc., Waukesha, WI (US)

( * ) Notice: Subject to any disclaimer, the term of this patent is extended or adjusted under 35 U.S.C. 154(b) by 886 days.

(21) Appl. No.: 11/014,089

(22) Filed: Dec. 16, 2004

(65) Prior Publication Data

US 2006/0131040 A1      Jun. 22, 2006

(51) Int. Cl.
*F15B 13/08*     (2006.01)
*A01B 63/102*    (2006.01)

(52) U.S. Cl. .......................................... 60/420; 91/508
(58) Field of Classification Search .................. 60/424, 60/484; 91/508; 111/200; 172/200
See application file for complete search history.

(56) References Cited

U.S. PATENT DOCUMENTS

| | | | |
|---|---|---|---|
| 3,048,981 A * | 8/1962 | Mark et al. .................... | 91/508 |
| 3,561,541 A * | 2/1971 | Woelfel ....................... | 172/265 |
| 4,193,458 A | 3/1980 | Meinert et al. | |
| 4,967,851 A | 11/1990 | Barber | |
| 5,918,558 A * | 7/1999 | Susag ......................... | 111/200 |
| 6,973,779 B2 * | 12/2005 | Naaktgeboren et al. ....... | 60/328 |

* cited by examiner

*Primary Examiner*—Thomas E Lazo
(74) *Attorney, Agent, or Firm*—Quarles & Brady; George E. Haas

(57) ABSTRACT

When different implements are attached to an agricultural tractor, various hydraulic actuators on the implement are operated by connection to the hydraulic system on the tractor. A single hydraulic fluid connector on the tractor has first and second ports with a separate valve assembly provided to control fluid of fluid to and from each port. This enables one doubling-acting hydraulic actuator to be connected to both connector ports so that the fluid flow to and from the actuator is controlled. For a different implement, one single-acting hydraulic actuator can be connected to one connector port and another single-acting hydraulic actuator can be connected to the other port of the same connector. Individual operation of the valve assembly for each port in this case allows independent control of the two single-acting hydraulic actuators.

15 Claims, 2 Drawing Sheets

CONFIGURABLE HYDRAULIC SYSTEM FOR AGRICULTURAL TRACTOR AND IMPLEMENT COMBINATION

CROSS-REFERENCE TO RELATED APPLICATIONS

Not Applicable

SPONSORED RESEARCH OR DEVELOPMENT

Not Applicable

BACKGROUND OF THE INVENTION

1. Field of the Invention

The present invention relates to hydraulic systems for an off-road vehicle, such as agricultural and construction equipment, and in particular to hydraulic systems on a tractor which can be configured to control actuators on different types of work implements removably connected to the off-road vehicle.

2. Description of the Related Art

With reference to FIG. 1, an agricultural tractor 10, of conventional construction, includes a main body carried on front steerable wheels (not shown) and rear tractor wheels 16. The rear portion of the tractor is illustrated with one wheel removed and portions of the tractor body broken away to reveal components of a standard three-point hitch 15. An agricultural implement 12, in this case a cultivator, is mounted to the three-point hitch 15 of the tractor 10.

The three-point hitch 15 comprises of a pair of trailing lower draft links 18 and an upper compression link 20. The draft links 18 are raised an lowered by an actuator comprising a single-acting rockshaft hydraulic cylinder 24 having a rod 26 coupled with a transversely extending rockshaft-lever assembly 30. The rockshaft-lever assembly 30 is pivotally connected to respective draft links 18 by drop links 28. When the rockshaft cylinder 24 is driven by pressurized hydraulic fluid, the rod 26 extends thereby raising the draft links 18. As hydraulic fluid is released from the rockshaft hydraulic cylinder 24 and the rod 26 is free to move, the draft links 18 drop and rise as the implement follows the ground contour. An upstanding coupler 32, at the rearward ends of the draft and compression links 18 and 20, is provided for connecting different implements to the three-point hitch 15.

The illustrated implement 12 includes a forwardly projecting mast structure 34 which engages the coupler 36 of the tractor 10. A toolbar 38 connected to the mast structure 34 supports a plurality of rearwardly projecting earth-working tools 40, such as cultivator shovels. A rearwardly extending lift assist frame 42 is rigidly connected to the toolbar 38 and has a trailing end to which a pair of parallel suspension links 44 are pivotally connected. The suspension links 44 in turn are pivotally attached to a wheel support 46 which carries a lift assist wheel 48. A double-acting hydraulic cylinder 49 is connected between the toolbar 38 and lift assist frame 42 lower the lift assist wheel 48 to the ground for transporting the implement 12 on a road or raise the lift assist wheel for plowing. The double-acting hydraulic cylinder 49 is connected by a pair of hoses to a hydraulic coupling at the rear of the tractor.

FIG. 2 illustrates the hydraulic system of the tractor 10 for powering the cylinders 24 and 49. Specifically, the hydraulic system 60 has a tank 62 containing hydraulic fluid. A pump 64 driven by the engine of the tractor fluid, draws hydraulic fluid from the tank 62 and sends the fluid under pressure into a supply line 66. A return line 68 is provided to bring the fluid back to the tank after passing through the actuators 24 and 49. A first three-way, three-position hydraulic valve 70 is coupled to the supply and return lines 66 and 68. The position of the first control valve 70 is governed by a mechanical lever 72 located on the tractor near the operators seat. The first control valve selectively couples either the supply line or the return line 66 or 68 to the single-acting rockshaft hydraulic cylinder 24. At one position of the first control valve 70, pressurized fluid from the supply line 66 is sent to the head chamber of the rock shaft hydraulic cylinder 24 to extend the piston. In another position of the first control valve, the head chamber of the rock shaft hydraulic cylinder 24 is connected to the tank return line 68 so that gravity operating on the hitch 15 forces the fluid from the cylinder to the tank 62 allowing the hitch and the implement 12 to lower. In the center, neutral position of the first control valve 70, the rockshaft hydraulic cylinder 24 is disconnected from both supply and the return lines 66 and 68.

A second control valve 74 is connected by a quick connect coupling 75 and hoses to the lift assist cylinder 49 on the implement 12. The second control valve 74 is a four-way, three-position valve that is operated by manual lever 76. In one extreme position of the second control valve 74, fluid is sent from the supply line 66 to the head chamber of the lift assist cylinder 49 and the fluid draining from the rod chamber is sent to the tank return line 68. In the other extreme valve position, the flow is reversed, i.e. pressurized fluid from the supply line 66 is fed to the rod chamber of the lift assist cylinder 49 and fluid is drained from the head chamber to the tank return line 68. This second control valve 74 also has a center, neutral position. A third control valve 78 on the tractor a four-way, three-position valve operated by lever 80. This control valve 78 feeds another quick connect coupling 82 which is not connected to the implement 12 in FIG. 1, as that implement does not have additional hydraulic actuators.

Some implements have a greater number of hydraulic actuators than implement 12 in FIG. 1, and thus, utilize the additional control capability provided by the third control valve 78. For example, the implement may have a single-acting hydraulic cylinder 84 which operates an implement component. In this case, only one hose is required for connection to the third control valve 78, and thus only one port of the quick connect coupling 82 is utilized. Although the second port of quick connect coupling 82 is unused in this case, another hydraulic actuator can not be connected to that unused port unless that additional actuator operates in a reverse tandem manner to hydraulic cylinder 84. Therefore, unless both of these additional actuators are to be operated in unison and in opposite directions (one actuator receives hydraulic fluid from supply line 66, while hydraulic fluid is being drained to the tank from the other actuator), it is impractical to connect another actuator to this unutilized port of quick connect coupling 82. Therefore conventional tractor hydraulic systems typically provide separate four-way control valves for each independently controlled actuator on the implement. This is may require a relatively large number of control valves and port pairs.

Agricultural tractors traditionally utilized manually operated control valves as shown in FIG. 2, which were mechanically operated by a levers manipulated by the farmer driving the tractor. There is a present trend away from hydromechanical controls toward electrohydraulic systems in which each valve is operated by a solenoid or other type of electrically powered mechanism. This simplifies the physical layout of the equipment, as all the valves to not have to be located relatively near the operator lever. Instead, an input device such as a joystick, located at the driver's position, is connected by electrical wires to control circuits that operate the solenoid valves situated anywhere on the tractor. Electrohydraulic controls also enable computerized control of the hydraulic system, which can provide many functions and features which are not practical with mechanical controls. For example, a single joystick motion may cause fluid at different flow rates to be supplied to several actuators.

SUMMARY OF THE INVENTION

An off-road vehicle, such as an agricultural tractor or construction vehicle, is capable of being attached to a variety of work implements and includes a hydraulic system for operating hydraulic actuators on the attached implements. The hydraulic actuators may comprise single-acting cylinders, double-acting cylinders, hydraulic motors, and similar devices. The hydraulic system has a tank for hydraulic fluid and a pump that supplies the hydraulic fluid under pressure. A fluid connector includes a first port and a second port to connect one or more hydraulic actuators on an implement to the tractor's hydraulic system.

A first valve assembly is coupled to the first port, the tank, and the pump. In a first state, the first valve assembly connects the first port to the pump and in a second state, the first port is connected to the tank. A second valve assembly is coupled to the second port, the tank, and the pump and has a third state in which the second port is coupled to the pump. In a fourth state the second valve assembly connects the second port to the tank.

A user input arrangement produces a first control signal and a second control signal which designate desired operation of the hydraulic actuators. A controller is connected to the first valve assembly, the second valve assembly, and the user input arrangement. The controller has a first mode of operation when the same hydraulic actuator is connected to both the first and second ports. In that first mode, the controller responds to the first control signal by operating both the first valve assembly and the second valve assembly. The controller operates in a second mode when one hydraulic actuator is connected to the first port and another hydraulic actuator is connected to the second port. In the second mode the controller responds to the first control signal by activating the first valve assembly and responds to the second control signal by activating the second valve assembly.

The two modes of operation enable a double-acting hydraulic actuator to be connected to both ports of the fluid connector so that the first and second valve assemblies control the flow of hydraulic fluid to and from that hydraulic actuator. For another implement having two single-acting hydraulic actuators, each actuator can be connected to different ports of the same fluid connector. In this case, the first valve assembly controls operation of one single-acting hydraulic actuator, while the second valve assembly controls operation of the other single-acting hydraulic actuator. This doubles the functionality of one fluid connector when single-acting hydraulic actuators are being controlled.

DETAILED DESCRIPTION OF THE INVENTION

Figure 3:
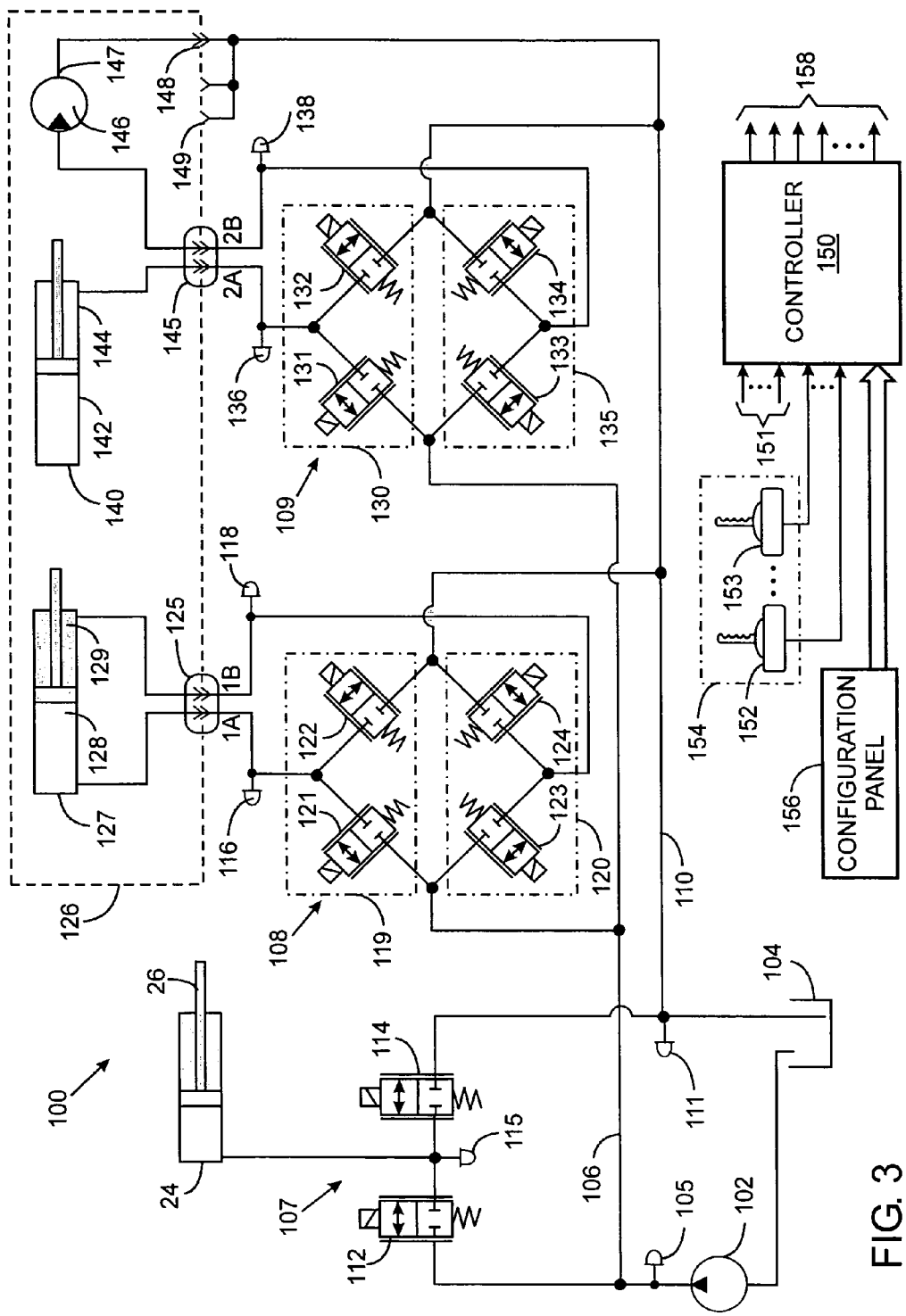
FIG. 3 is a schematic diagram of a hydraulic system according to the present invention.

With reference to FIG. 3, a novel hydraulic circuit 100 for the agricultural tractor 10 and its implements comprises a pump 102 that is driven by the engine of the tractor. The pump 102 draws fluid from a reservoir, or tank, 104 and supplies that fluid under pressure into a supply line 106 which extends to a three control valve sets 107, 108 and 109. A return line 110 conveys fluid back from each of the control valve sets 107-109 to the tank 104. Separate pressure sensors 105 and 111 are connected to the supply line 106 and the return line 110, respectively, to provide electrical signals indicating the pressure in those lines.

The first control valve set 107 has an electrically operated, proportional supply valve 112 which controls the flow of hydraulic fluid from supply line 106 to the single-acting rockshaft hydraulic cylinder 24. That rockshaft hydraulic cylinder 24 is connected by an electrically operated proportional return valve 114 to the return line 110. Both of these valves 112 and 114, and other control valves used in hydraulic circuit 100, may be any one of a number of commercially available types, such as the one described in U.S. Pat. No. 6,328,275. Operation of the supply and tank valves 112 and 114 control the flow of fluid to and from the rockshaft hydraulic cylinder, which as described previously, raises and lowers the hitch 15 at the rear of the tractor. A pressure sensor 115 produces an electrical signal indicating the pressure in the head chamber of the rockshaft hydraulic cylinder 24.

Figure 1:
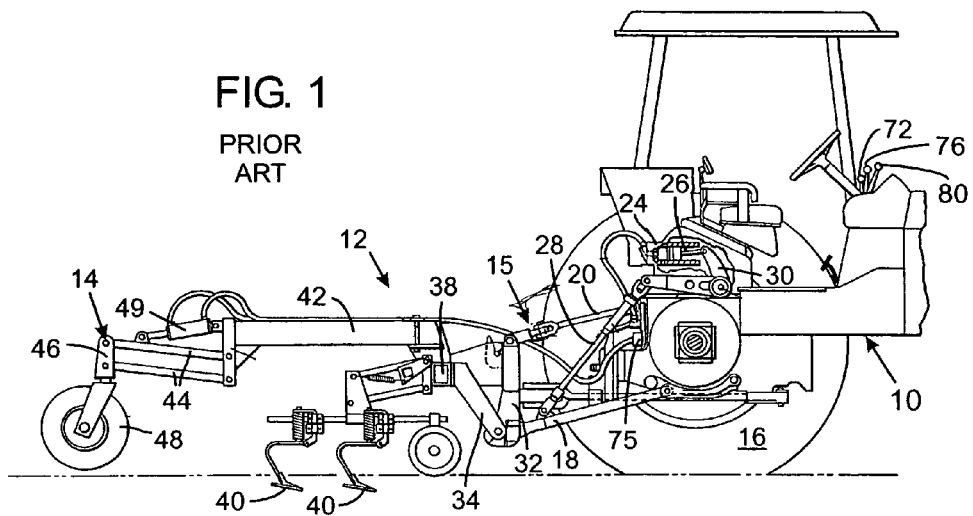
FIG. 1 is a side view of an agricultural tractor with an attached implement according to the prior art.
Figure 2:
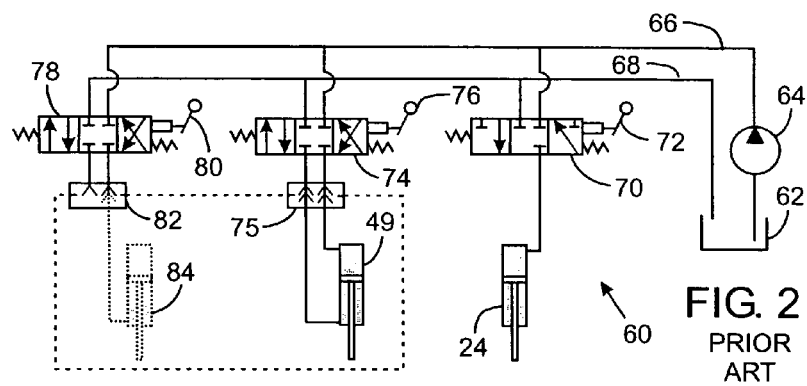
FIG. 2 is a schematic representation of a prior art hydraulic system on the tractor for powering actuators on the implement of FIG. 1.
Figure 4:
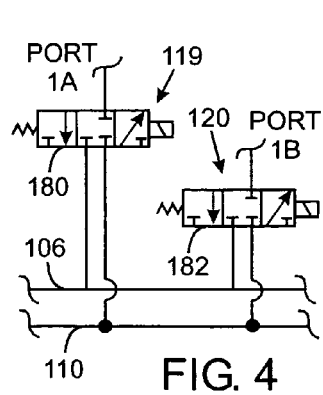
FIG. 4 depicts an alternative control valve assembly for use in the hydraulic system of FIG. 3.

The tractor hydraulic circuit 100 has a second control valve set 108 that comprises four electrically operated, proportional control valves 121, 122, 123 and 124 which control the flow of fluid between the supply and return lines 106 and 110 and a first fluid connector 125 at the rear of the tractor 10. The first fluid connector 125 has fittings, designated Port 1A and Port 1B, for two hydraulic hoses. These fittings have internal check valves that close the fluid path when the mating connector is removed. The second control valve set 108 has a two valve assemblies 119 and 120 which control the flow of fluid to and from each of these separate ports 1A and 1B. The first valve assembly 119 comprises the first proportional control valve 121, which governs the flow of hydraulic fluid from the supply line 106 to Port 1A, and a second control valve 122, that controls the flow of fluid between Port 1A and the return line 110. Similarly, the second valve assembly 120 includes the third control valve 123, which governs the flow of fluid between the supply line 106 and Port 1B, and the fourth control valve 124, which controls the flow of fluid between Port 1B and the return line 110. Separate pressure sensors 116 and 118 are connected to the respective Ports 1A and 1B to provide electrical signals indicating the pressure at the respective port Although each of the first and second valve assemblies 119 and 120 in the exemplary hydraulic circuit 100 have a pair of separately operated control valves (121 and 122, or 123 and 124), a single electrically operated, three-way, three-position spool valve 180 or 182 can be used, as shown in FIG. 4. Such spool valves 180 and 182 have one position in which the supply line 106 is connected to the respective connector port, another position in which the return line 110 is connected to that connector port, and a closed position.

Referring again to FIG. 3, hydraulic devices on an implement 126 towed by the tractor 10 are operated by connecting the associated hydraulic lines to the first fluid connector 125. For example, a double acting hydraulic cylinder 127 on the implement 126 has a head chamber 128 connected by a hydraulic line to Port 1A and has a rod chamber 129 connected by another hydraulic line to Port 1B. As will be described, selective operation of specific valves 121-124 sends fluid from the supply line 106 to one of the chambers 128 or 129 of cylinder 127 and drains other fluid from the opposite chamber to the tank return line 110. Such fluid flow extends and retracts the piston rod with respect to the cylinder 127

The third control valve set 109 has a similar construction to the second control valve set 108 and governs the flow of fluid between a second fluid connector 145 on the tractor and the supply and return lines 106 and 110. The second fluid connector 145 also has two ports designated Port 2A and Port 2B. The third control valve set 109 is formed third and fourth assemblies 130 and 135 which separately control flow of fluid to and from Ports 2A and 2B. The third valve assembly 130 has a fifth electrohydraulic proportional control valve 131 that connects the supply line 106 to Port 2A and a sixth electrohydraulic control valve 132 connecting Port 2A to the tank return line 110. The fourth valve assembly 135 includes a seventh electrohydraulic valve 133 and an eighth electrohydraulic valve 134 which respectively connect Port 2B to the supply line 106 and the return line 110. A single electrically operated, three-position spool valve can be used in place of the two separate control valves in each of the third and fourth assemblies 130 and 135. A pair of pressure sensors 136 and 138 provide electrical signals indicating the pressure in Ports 2A and 2B.

On previous tractors where a pair of ports (e.g. 2A and 2B) were combined into a single fluid connector on the agricultural tractor, fluid flow to both ports was controlled in tandem. Therefore, different hydraulic actuators could not be connected to the two ports and individually controlled. In contrast, the present hydraulic circuit 100 enables independent control of two different actuators 140 and 146 each of which is connected to a different port. In the present example, a single-acting hydraulic cylinder 140 has its rod chamber 144 connected to Port 2A and its head chamber 142 is open to atmosphere. Operation of the single-acting hydraulic cylinder 140 is individually controlled by the fifth and sixth electrohydraulic proportional control valves 131 and 132 in the third valve assembly 130.

Port 2B of the second fluid connector 145 is coupled to an inlet of a hydraulic motor 146 on the implement 126. The hydraulic motor 146 has an outlet 147 that is connected to a fluid coupling 148 on the tractor which is directly connected to the tank return line 110. The term "directly connected" as used herein means that the associated components are connected together by a conduit without any intervening element, such as a valve, an orifice or other device, which restricts or controls the flow of fluid beyond the inherent restriction of any conduit. Additional tank return line couplings 149 are provided to accommodate implements which have additional hydraulic motors or other actuators requiring direct connection to the tank return line. Because fluid flows through the fourth valve assembly 135 only from the supply line 106 to the hydraulic motor 146, the motor 146 is controlled independently by only the seventh proportional control valve 133. If port 2A is not required to power a different hydraulic actuator such as the single-acting cylinder 140, the outlet 147 of hydraulic motor 146 could be connected to Port 2A. In which case, the sixth proportional control valve 132 is opened fully to provide an unrestricted path to the tank return line 110 and operation of the hydraulic motor 146 still is controlled by metering fluid to Port 2B through the seventh proportional control valve 133.

The pressure sensors located throughout the tractor's hydraulic circuit 100 provide signals to inputs 151 of an electronic controller 150. The controller 150 also receives signals from a user input arrangement 154 located near the operator seat of the tractor 10 and comprising a plurality of user input devices 152 and 153, such as dual axis joysticks, by which the tractor operator designates how the hydraulic actuators 24, 127, 140 and 146 on the implement are to be operated. A configuration panel 156 provides a set of input signals to the controller 150, thereby enabling the tractor operator to configure the hydraulic circuit 100 for use with a variety of implements having different types of hydraulic actuators, as will be described. The controller 150 comprises a conventional microcomputer based circuit which executes a software program that responds to the inputs signals by producing signals at outputs 158 that are connected to the individual hydraulic valves within sets 107, 108 and 109.

As can be seen from FIG. 3, the second control valve set 108 operates a double-acting actuator cylinder 127 by independently controlling the flow of fluid to the cylinder from the supply 106 and back to the return line 110. In contrast, the third control valve set 109 has its Ports 2A and 2B connected to separate actuators 140 and 146, and thus, the controller 150 has to be configured to independently control the flow for each of those actuators.

Figure 5:
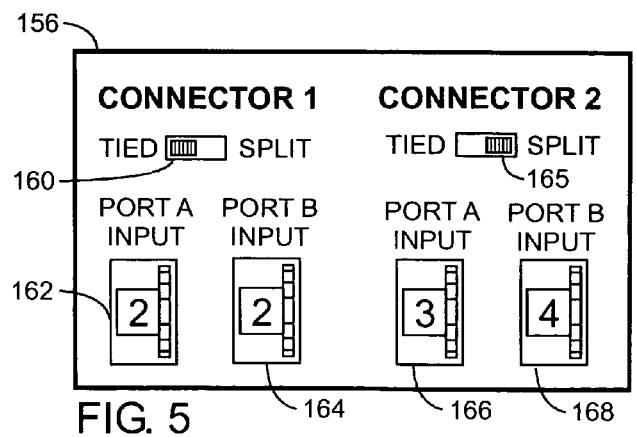
FIG. 5 illustrates a configuration panel for selecting a mode of operation for each hydraulic fluid connector of the hydraulic system in FIG. 3.

That configuration is accomplished via the configuration panel 156 shown in detail in FIG. 5. The configuration panel 156 has sections associated with each of the first and second fluid connectors 125 and 145, designated CONNECTOR 1 and CONNECTOR 2. For the first fluid connector 125, the configuration panel 156 has a first slider switch 160 by which the tractor operator designates whether control of the first fluid connector Ports 1A and 1B is to be electronically tied together (tied mode of operation) in order to operate double-acting actuator for example, or whether the port control is to be split for independent operation of two hydraulic actuators (split mode of operation). Because the second control valve set 108 controls double-acting cylinder 127 in the exemplary system in FIG. 3, control of Ports 1A and 1B is tied together. The configuration panel section for the first fluid connector 125 also includes two input selectors 162 and 164 by which the tractor operator designates which controller input connected to the user input arrangement 154 receives a signal for controlling fluid flow through Port 1A and Port 1B, respectively. When control of the ports is tied together, as in the case for the first fluid connector 125, both input selectors designate the same input for the controller 150 as controlling both Ports 1B and 1B. The input selectors 162 and 164 may be a manually operated thumb-wheel type selector switches with a numerical display indicating the controller input that is selected (e.g. the second input in the case of selectors 162 and 164).

In the hydraulic circuit 100 of FIG. 3, the second fluid connector 145 is split for operating two hydraulic actuators 140 and 146. Thus, the selector switch 165 on the configuration panel 156 for CONNECTOR 2 is set in the split position in FIG. 5. In this case, the input selectors 166 and 168 for the second fluid connector 145 designate separate inputs (3 and 4) of the controller 150, with one input controlling flow of fluid through Port 2A to the single-acting hydraulic cylinder 140 and another input, designated by input selector 168, controlling fluid flow through Port 2B to the hydraulic motor 146.

The electrical signals indicating the settings of the input selectors 160-168 on the configuration panel 156 are fed to the controller 150 in FIG. 3. The controller 150 employs these input selector signals to determine which signal from the user input devices 152 and 153 control the flow of fluid to the which fluid ports. The controller inputs designated by input selectors 162, 164, 166 and 168 refer to a signals from one of the axes of the two dual axes joystick, user input devices 152 and 153. For example, with respect to the second fluid connector 145, movement of joystick 153 about the X axis is used to control the flow of fluid through Port 2A, whereas movement of the same joystick about the Y axis controls the fluid flow through Port 2B. As a result, the same joystick 153 can be used to control both actuators 140 and 146.

For the first fluid connector 125, the configuration panel 156 designates that the second controller input connected to the first input device 152 is to operate the second control valve set 108. Assume that the tractor operator has activated the first input device 152 in a direction which indicates a desire to extend the piston rod from the cylinder 127. The controller 150 responds to the degree to which that input device 152 is moved by opening the first hydraulic valve 121 a corresponding amount to apply fluid from the supply line 106 to Port 1A. This flow continues into the head chamber 128 of the double acting cylinder 127 to force the piston to extend the rod. At the same time, the controller 150 applies an electrical signal to the fourth control valve 124 to open a passage between Port 1B and the tank return line 110 so that fluid being forced from the cylinder's rod chamber 129 can flow to the tank 104. The controller 150 can operate the first and fourth control valves 121 and 124 to independently meter the fluid flowing to and from the double acting cylinder 127. Operation of one of those valves can be controlled to achieve a desired flow rate, while the other valve can be controlled to achieve a desired pressure level in the cylinder or across the valve. In a similar fashion when the tractor operator manipulates the first input device 152 to retract the piston rod into cylinder 127, the controller 150 activates the second and third control valve 122 and 123 of set 108 so that fluid from the supply line 106 is applied to the rod chamber 129 through Port 1B and fluid is exhausted from the head chamber 128 through Port 1A to the return line 110.

Considering the second fluid connector 145 and the third control valve set 109, the settings of the configuration panel 156 designate that the signal at the third input of the controller 150 controls the flow through Port 2A, while the fourth controller input governs flow through Port 2B. As noted previously, the third and fourth inputs may be the different axes of the joystick that comprises the second input device 153. As a result, when the tractor operator manipulates the second input device to direct operation of the single-acting cylinder 140, the controller 150 responds by operating only the fifth or sixth control valve 131 or 132. In particular, when the second input device 15 is being manipulated to indicate that the rod of the single acting cylinder 140 is to be retracted, controller 150 responds by opening the fifth control valve 131 a proportional amount to apply fluid from the supply line 106 through Port 2A to the rod chamber 144. Similarly, to extend the rod from the single acting cylinder 140, the controller 150 opens only the sixth control valve 132 which allows fluid to drain from the rod chamber 141 through Port 2A to the return line 110, due to the force of gravity acting on the components of the implement 126 which are connected to the cylinder 140. Because the Ports 2A and 2B are split, the controller 150 does not activate the seventh and eighth valves 133 and 134 for Port 2B in response to the signal from the second input device 153 at the third controller input.

Instead, the flow of fluid through Port 2B is controlled by the signal applied to the fourth input of the controller 150, as specified by selector switch 168 on the configuration panel 156. Fluid flows only in a direction from Port 2B to the hydraulic motor 146 because the fluid returns to the tractor through the separate return line coupling 148. Therefore, the eighth control valve 134 is not utilized to operate the hydraulic motor 146 in this configuration. When the tractor operator manipulates the fourth input device, the controller 150 responds by opening the seventh control valve 133 sending fluid from the supply line 106 through Port 2B to the hydraulic motor 146.

It should be understood that the configuration illustrated for the second fluid connector 145, which enables independent control of the flow through Ports 2A and 2B, can be employed to control two single acting cylinders, two hydraulic motors, or other combinations of two devices which require flow through only a single hydraulic line to be controlled. Thus, an agricultural tractor which incorporates the present hydraulic system can be utilized with a wide variety of implements having different numbers and types of hydraulic actuators.

The separate valve assemblies which independently control the fluid flow to and from each connector port A and B enable the present hydraulic circuit 100 to be reconfigured as different implements are connected to the tractor. For example, when a double-acting cylinder is connected to both ports of the same fluid connector, the associated valve assemblies are operated in unison. Alternatively, control of both ports A and B of a given fluid connector can be split so that the fluid flow through each port is controlled independently enabling two hydraulic actuators, such as cylinder 140 and hydraulic motor 146, to be individually operated.

The foregoing description was primarily directed to a preferred embodiment of the invention. Although some attention was given to various alternatives within the scope of the invention, it is anticipated that one skilled in the art will likely realize additional alternatives that are now apparent from disclosure of embodiments of the invention. Accordingly, the scope of the invention should be determined from the following claims and not limited by the above disclosure.

The invention claimed is:

1. A hydraulic system for an off-road vehicle to which is attached an implement having one or more hydraulic actuators, the hydraulic system comprising:
   a tank for hydraulic fluid;
   a pump supplying hydraulic fluid under pressure;
   a fluid connector having a first port and a second port for connection to the one or more hydraulic actuators on the implement;
   a first valve assembly coupled to the first port, the tank, and the pump, the first valve assembly having a first state which connects the first port to the pump and a second state which connects the first port to the tank;
   a second valve assembly coupled to the second port, the tank, and the pump, the second valve assembly having a third state which connects the second port to the pump and a fourth state which connects the second port to the tank;
   a user input arrangement which produces a first control signal and a second control signal that designate operation of the one or more hydraulic actuators; and
   a controller connected to the first valve assembly, the second valve assembly, and the user input arrangement, and having a first mode of operation when one hydraulic actuator is connected to both the first and second ports in which the controller responds to the first control signal by operating both the first valve assembly and the second valve assembly, and having a second mode of operation when one hydraulic actuator is connected to the first port and another hydraulic actuator is connected to the second port in which the controller responds to the first control signal by activating the first valve assembly and responds to the second control signal by activating the second valve assembly.

2. The hydraulic system as recited in claim 1 further comprising a configuration input device which designates whether the controller operates in the first mode or the second mode.

3. The hydraulic system as recited in claim 2 wherein the configuration input device further comprises a selector for designating which of the first and second first control signals operates the first valve assembly and which of the first and second first control signals operates the second valve assembly.

4. The hydraulic system as recited in claim 2 wherein the configuration input device is operable by a user of the off-road vehicle.

5. The hydraulic system as recited in claim 1 wherein each of the first valve assembly and the second valve assembly comprises a pair of proportional control valves which are individually electrically operated.

6. The hydraulic system as recited in claim 1 wherein each of the first valve assembly and the second valve assembly comprises a three-way, three-position spool valve which is electrically operated.

7. The hydraulic system as recited in claim 1 further comprising a tank port connected to the tank to receive fluid from a hydraulic actuator, wherein that fluid flows to the tank bypassing the first valve assembly and the second valve assembly.

8. A hydraulic system for an off-road vehicle to which is attached an implement having one or more hydraulic actuators, the hydraulic system comprising:
   a tank for hydraulic fluid;
   a pump connected to the tank and supplying hydraulic fluid under pressure;
   a fluid connector having a first port and a second port for connection to at least one of the one or more hydraulic actuators on the implement;
   a first valve assembly which is electrically operated and is coupled to the first port, the tank, and the pump, wherein the first valve assembly has a first state in which the first port is connected to the pump and a second state in which the first port is connected to the tank;
   a second valve assembly which is electrically operated and is coupled to the second port, the tank, and the pump, wherein the second valve assembly has a third state in which the second port is connected to the pump and a fourth state in which the second port is connected to the tank;
   a user input arrangement which produces a first control signal and a second control signal designating desired movement of the one or more hydraulic actuators;
   a configuration input device which designates a first mode of operation when a given hydraulic actuator is connected to both the first port and second port, and a second mode of operation when one hydraulic actuator is connected to the first port and another hydraulic actuator is connected to the second port; and
   a controller connected to the first valve assembly, the second valve assembly, the user input arrangement, and the configuration input device, wherein when the first mode of operation is designated the controller operates both the first valve assembly and the second valve assembly in response to the first control signal, and when the second mode of operation is designated the controller operates the first valve assembly in response to the first control signal and operates the second valve assembly in response to the second control signal.

9. The hydraulic system as recited in claim 8 wherein the configuration input device further comprises a selector for designating which of the first and second first control signals operates the first valve assembly and which of the first and second first control signals operates the second valve assembly.

10. The hydraulic system as recited in claim 8 wherein the given hydraulic actuator is a double-acting hydraulic cylinder.

11. The hydraulic system as recited in claim 8 wherein the one hydraulic actuator is a single-acting hydraulic cylinder.

12. The hydraulic system as recited in claim 8 wherein the one hydraulic actuator is a hydraulic motor.

13. The hydraulic system as recited in claim 8 further comprising a tank port connected to the tank to receive fluid from a hydraulic actuator, wherein that fluid flows to the tank bypassing the first valve assembly and the second valve assembly.

14. The hydraulic system as recited in claim 8 wherein each of the first valve assembly and the second valve assembly comprises a pair of proportional control valves which are individually electrically operated.

15. The hydraulic system as recited in claim 8 wherein each of the first valve assembly and the second valve assembly comprises a three-way, three-position spool valve which is electrically operated.

* * * * *